United States Patent
Kim et al.

(10) Patent No.: US 11,835,055 B2
(45) Date of Patent: Dec. 5, 2023

(54) FAN CONTROL DEVICE AND SETTING METHOD

(71) Applicant: FANUC CORPORATION, Minamitsuru-gun (JP)

(72) Inventors: Kwangsoo Kim, Yamanashi-ken (JP); Tetsuro Matsudaira, Yamanashi-ken (JP)

(73) Assignee: FANUC CORPORATION, Yamanashi-Ken (JP)

(*) Notice: Subject to any disclaimer, the term of this patent is extended or adjusted under 35 U.S.C. 154(b) by 0 days.

(21) Appl. No.: 17/800,811

(22) PCT Filed: Feb. 22, 2021

(86) PCT No.: PCT/JP2021/006648
§ 371 (c)(1),
(2) Date: Aug. 18, 2022

(87) PCT Pub. No.: WO2021/172277
PCT Pub. Date: Sep. 2, 2021

(65) Prior Publication Data
US 2023/0084489 A1    Mar. 16, 2023

(30) Foreign Application Priority Data
Feb. 26, 2020    (JP) .................. 2020-030233

(51) Int. Cl.
*F04D 27/00*    (2006.01)
*F04D 25/16*    (2006.01)

(52) U.S. Cl.
CPC .................. *F04D 27/004* (2013.01)

(58) Field of Classification Search
CPC .............. F04D 27/004; F04D 25/166
See application file for complete search history.

(56) References Cited

U.S. PATENT DOCUMENTS

2010/0296945 A1* 11/2010 Nitta ............... H05K 7/20836
417/2
2011/0295524 A1* 12/2011 Tada ................ H05K 7/20181
702/45

(Continued)

FOREIGN PATENT DOCUMENTS

| JP | H06-244577 A | 9/1994 |
| JP | 2015-220317 A | 12/2015 |
| JP | 2018-516393 A | 6/2018 |

OTHER PUBLICATIONS

International Search Report (ISR) (PCT Form PCT/ISA/210), in PCT/JP2021/006648, dated Apr. 27, 2021.

*Primary Examiner* — Long T Tran
(74) *Attorney, Agent, or Firm* — McGinn I.P. Law Group, PLLC

(57) ABSTRACT

Provided are a fan control device and a setting method capable of appropriately controlling fans even if a fan configuration pattern is modified. A fan control device is provided with: an acquiring unit for acquiring the quantity and types of fans connected to input/output ports; a storage unit for storing a plurality of fan configuration patterns indicating the quantity and types of the fans; a specifying unit for specifying a fan configuration pattern matching the quantity and types of fans acquired by the acquiring unit, from among the plurality of fan configuration patterns stored in the storage unit; and a setting unit for setting, in the fans connected to the input/output ports, a rotational speed threshold for use when the fans are rotated, associated with the fan configuration pattern specified by the specifying unit.

12 Claims, 3 Drawing Sheets

(56) References Cited

U.S. PATENT DOCUMENTS

| | | | |
|---|---|---|---|
| 2012/0156530 A1* | 6/2012 | Kang | H01M 10/63 |
| | | | 429/50 |
| 2013/0162438 A1* | 6/2013 | Wu | G06F 11/3058 |
| | | | 340/670 |
| 2014/0218860 A1 | 8/2014 | Yu et al. | |
| 2017/0219239 A1 | 8/2017 | Lovicott et al. | |
| 2018/0156225 A1* | 6/2018 | Izumi | H02K 11/21 |
| 2018/0184549 A1* | 6/2018 | Wang | H05K 7/20772 |

\* cited by examiner

FIG. 2

| FAN CONFIGURATION PATTERN 1 | FAN A TWO | FAN A: ○○○rpm |
|---|---|---|
| FAN CONFIGURATION PATTERN 2 | FAN A TWO FAN B TWO | FAN A: △△△rpm FAN B: ×××rpm |
| FAN CONFIGURATION PATTERN 3 | FAN B FOUR | FAN B: □□□rpm |
| ⋮ | ⋮ | ⋮ |

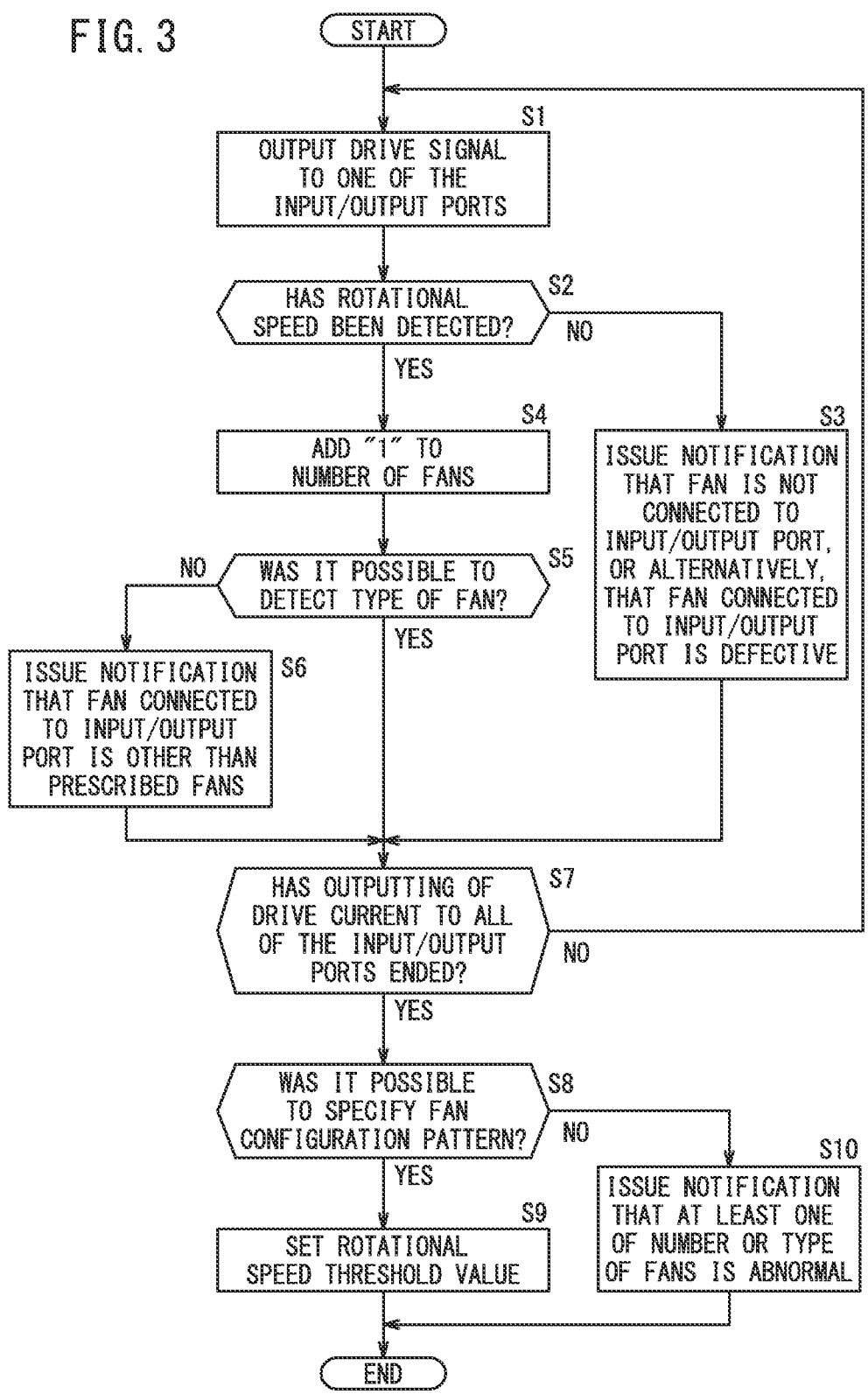

FAN CONTROL DEVICE AND SETTING METHOD

TECHNICAL FIELD

The present invention relates to a fan control device having a plurality of input/output ports, and which is configured to control one or more fans that are connected to the plurality of input/output ports, as well as a setting method.

BACKGROUND ART

In JP H06-244577 A, a fan control device is disclosed which includes a plurality of input/output ports, and controls three fans that are connected to the aforementioned input/output ports. Such a fan control device is equipped with a function to individually control the rotation of a plurality of fans, a function to recognize the number of the fans connected to the input/output ports, and a function to individually determine whether or not the fans connected to the input/output ports are rotating abnormally.

SUMMARY OF THE INVENTION

Incidentally, in certain cases, a fan configuration pattern of the fans connected to the input/port ports is changed. For example, "X" type fans connected respectively to two from among the four input/output ports may be replaced with "Y" type fans connected respectively to the four input/output ports. In this case, since the number and the type of the fans are changed, a change will occur between a threshold value of a rotational speed when the fans are controlled prior to the fan configuration pattern being changed, and a threshold value of the rotational speed when the fans are controlled after the fan configuration pattern has been changed.

In the fan control device according to JP H06-244577 A, the rotations of the plurality of fans are individually controlled, however, the specific content of the aforementioned rotational control cannot be changed during operation of the fans. Therefore, in the case that the fan configuration pattern is changed, there is a concern that the fans will become incapable of being controlled appropriately.

Thus, the present invention has the object of providing a fan control device and a setting method which are capable of appropriately controlling the fans even if the fan configuration pattern is changed.

A first aspect of the present invention is characterized by a fan control device including a plurality of input/output ports, and configured to control one or more fans that are connected to the plurality of input/output ports, the fan control device including:

an acquisition unit configured to acquire a number of the fans connected to the input/output ports and a type of fan of each of the fans connected to the input/output ports;

a storage unit in which a plurality of fan configuration patterns indicating the number of the fans and the type of fan are stored;

a specification unit configured to specify, from among the plurality of the fan configuration patterns stored in the storage unit, a fan configuration pattern that coincides with the number of the fans and the type of fan acquired by the acquisition unit; and a setting unit configured to set, in the fans connected to the input/output ports, a threshold value of a rotational speed when the fans are made to rotate, the threshold value being associated with the fan configuration pattern specified by the specification unit.

A second aspect of the present invention is characterized by a setting method of setting a threshold value of a rotational speed when a fan control device including a plurality of input/output ports and configured to control one or more fans that are connected to the plurality of input/output ports, causes the fans to rotate, the setting method including:

an acquisition step of acquiring a number of the fans connected to the input/output ports and a type of fan of each of the fans connected to the input/output ports;

a specification step of specifying, from among a plurality of fan configuration patterns indicating the number of the fans and the type of fan, a fan configuration pattern that coincides with the number of the fans and the type of fan acquired in the acquisition step; and a setting step of setting, in the fans connected to the input/output ports, the threshold value associated with the fan configuration pattern specified in the specification step.

According to the aspects of the present invention, the fans can be appropriately controlled even if the fan configuration pattern is changed.

BRIEF DESCRIPTION OF THE DRAWINGS

FIG. 2 is a conceptual diagram showing an exemplary configuration of a table; and FIG. 3 is a flowchart showing a procedure of a setting process.

DESCRIPTION OF THE INVENTION

Figure 1:
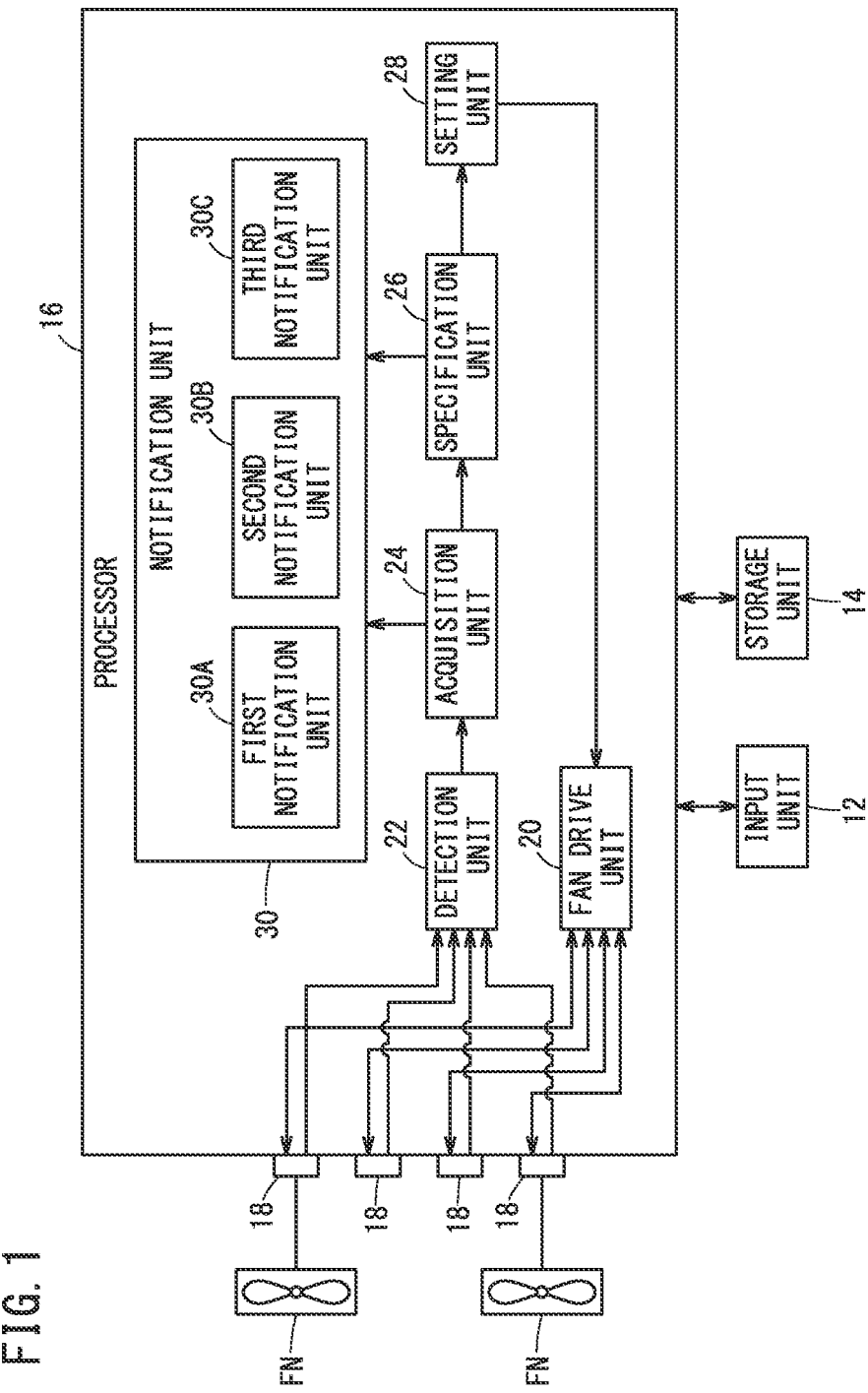
FIG. 1 is a block diagram showing the configuration of a fan control device according to an embodiment of the present invention.

A preferred embodiment of the present invention will be presented and described in detail below with reference to the accompanying drawings.

Embodiment

FIG. 1 is a block diagram showing the configuration of a fan control device 10 according to an embodiment of the present invention. The fan control device 10 is equipped with an input unit 12, a storage unit 14, and a processor 16.

The input unit 12 serves to input information. As examples of the input unit 12, there may be cited a mouse, a keyboard, a touch panel, or the like. The storage unit 14 serves to store information. As examples of the storage unit 14, there may be cited a hard disk, a portable memory, or the like. A setting program in order to set a threshold value of a rotational speed when a fan FN is made to rotate, and the like are stored in the storage unit 14.

The processor 16 processes information. As examples of the processor 16, there may be cited a CPU, an MPU, or the like. The processor 16 includes a plurality of input/output ports 18. At least one fan FN that rotates at a rated rotational speed is connected to the plurality of input/output ports 18. It is noted that one fan FN is capable of being connected to each of the input/output ports 18. According to the present embodiment, the number of the input/output ports 18 is four, and the number of the fans FN connected to the input/output ports 18 is two.

In the case that a start command of a setting process for setting a threshold value for the rotational speed at a time when the fans FN are made to rotate is input from the input unit 12, the processor 16 executes the setting program that is stored in the storage unit 14. In this case, the processor 16 functions as a fan drive unit 20, a detection unit 22, an acquisition unit 24, a specification unit 26, a setting unit 28, and a notification unit 30.

The fan drive unit 20 serves to drive the fans FN. In a manner so that the fans FN are rotated at the rated rotational speed, the fan drive unit 20 outputs a drive current for driving the fans FN from each of the plurality of input/output ports 18. In this instance, in the case that the fan FN is connected to the input/output port 18, signals exhibiting a change in accordance with the rotational speed are output from the fan FN, and the signals output from the aforementioned fan FN are input to the processor 16 from the input/output port 18. On the other hand, in the case that the fan FN is not connected to the input/output port 18, signals that do not change in accordance with the rotational speed are output from the fan FN, and the signals output from the aforementioned fan FN are input to the processor 16 from the input/output port 18.

The detection unit 22 detects the rotational speed based on the signals input from each of the plurality of input/output ports 18. In the case that the signals input from the input/output ports 18 exhibit a change in accordance with the rotational speed, the detection unit 22 detects the rotational speed from the aforementioned change. On the other hand, in the case that the signals input from the input/output ports 18 do not exhibit a change in accordance with the rotational speed, the detection unit 22 cannot detect the rotational speed.

The acquisition unit 24 acquires the number and the type or types of the fans FN connected to the input/output ports 18. The acquisition unit 24 acquires the number of detections detected by the detection unit 22 as the number of the fans FN connected to the input/output ports 18. According to the present embodiment, the number of detections detected by the detection unit 22 is two.

Using a table stored in advance in the storage unit 14, the acquisition unit 24 acquires the type of the fans FN connected to the input/output ports 18. In the table, the rated rotational speeds of the fans FN and the type of the fans FN are associated with each other. Using the table, the acquisition unit 24 specifies a rated rotational speed in which a difference thereof from the rotational speed detected by the detection unit 22 lies within an allowable error range, and the type of the fan FN associated with the specified rated rotational speed is acquired as the type of the fan FN connected to the input/output port 18.

Moreover, in the case that a rated rotational speed in which the difference thereof from the rotational speed detected by the detection unit 22 lies within the allowable error range is not in the table, this indicates that a fan FN other than the prescribed fans FN is connected to the input/output ports 18. In this case, since the acquisition unit 24 is unable to specify a rated rotational speed in which the difference from the rotational speed detected by the detection unit 22 lies within the allowable error range, the acquisition unit 24 is unable to acquire the type of the fan FN connected to the input/output port 18.

The specification unit 26 serves to specify the fan configuration pattern of the fans connected to the input/output ports 18. As shown in FIG. 2, in the storage unit 14, there are stored in advance the fan configuration patterns indicating the number and the type of the fans FN. In the example shown in FIG. 2, in the fan configuration pattern "1", it is indicated that there are two fans FN of the type "A". In the fan configuration pattern "2", it is indicated that there are two fans FN of the type "A" and two fans FN of the type "B". In the fan configuration pattern "3", it is indicated that there are four fans FN of the type "B".

In each of the fan configuration patterns, a threshold value for the rotational speed when the fans FN are made to rotate is associated with each type of the fans FN in the aforementioned fan configuration pattern. The threshold value may be an upper limit value, a lower limit value, or both an upper limit value and a lower limit value. In the example shown in FIG. 2, in the fan configuration pattern "1", a lower limit value of "○○○ rpm" is associated with the fan FN of the type "A". In the fan configuration pattern "2", a lower limit value of "△△△ rpm" is associated with the fan FN of the type "A", and a lower limit value of "xxx rpm" is associated with the fan FN of the type "B". In the fan configuration pattern "3", a lower limit value of "□□□ rpm" is associated with the fan FN of the type "B".

Moreover, in the example shown in FIG. 2, although the lower limit values of the rotational speed when the fans FN are made to rotate, and the number and the type of the fans FN appear in the same table, the lower limit values and the number and the type of the fans FN need not necessarily appear in the same table. Further, although the lower limit value of "xxx rpm" associated with the fan FN of the type "B" of the fan configuration pattern "2", and the lower limit value of "□□□ rpm" associated with the fan FN of the type "B" of the fan configuration pattern "3" differ from each other, the lower limit values may be the same.

From among the plurality of the fan configuration patterns stored in the storage unit 14, the specification unit 26 specifies a fan configuration pattern that coincides with the number and the type of the fans FN acquired by the acquisition unit 24. Moreover, in the case that a fan configuration pattern that coincides with the number and the type of the fans FN acquired by the acquisition unit 24 does not exist, a fan configuration pattern other than the prescribed fan configuration patterns is adopted. In other words, at least one of the number or the type of the fans FN is abnormal. In this case, the specification unit 26 is unable to specify a fan configuration pattern that coincides with the number and the type of the fans FN acquired by the acquisition unit 24.

Moreover, according to the present embodiment, since the number of the fans FN connected to the input/output ports 18 is two, in the example shown in FIG. 2, the fan configuration pattern "1" is a candidate for the fan configuration pattern that coincides with the number and the type of the fans FN acquired by the acquisition unit 24.

The setting unit 28 serves to set, in the fans FN that are connected to the input/output ports 18, the threshold value or threshold values of the rotational speed when the fans FN are made to rotate, the threshold value or threshold values being associated with the fan configuration pattern specified by the specification unit 26. On the basis of the acquisition result of the acquisition unit 24, the setting unit 28 recognizes the fans FN connected to the input/output ports 18, and with respect to the recognized fans FN, sets the threshold values which are associated with the fan configuration pattern specified by the specification unit 26. Moreover, in the case that the threshold values are set, the fan drive unit 20 drives the fans FN on the basis of the set threshold values, in a normal process other than the setting process for setting the threshold values of the rotational speed when the fans FN are made to rotate. More specifically, in the case of the threshold value being the upper limit value, the fan drive unit 20 outputs the drive current for driving the fans FN, in a manner so as not to exceed the set upper limit value. Further, in the case of the threshold value being the lower limit value, the fan drive unit 20 outputs the drive current for driving the fans FN, in a manner so as not to fall below the set lower limit value. Further, in the case of the threshold value being the upper limit value and the lower limit value, the fan drive unit 20 outputs the drive current for driving the fans FN, in a manner so as to reside within a range between the upper limit value and the lower limit value.

The notification unit 30 serves to issue a notification regarding an abnormality. In the case that at least one of a display unit, a speaker, or a light emitting unit is provided in the fan control device 10, the notification unit 30 may issue the notification regarding the abnormality by using at least one of the display unit, the speaker, or the light emitting unit. Further, in the case that an external device equipped with at least one of a display unit, a speaker, or a light emitting unit is connected to the fan control device 10, the notification unit 30 may issue the notification regarding the abnormality by transmitting an operation signal to such an external device.

The notification unit 30 includes a first notification unit 30A, a second notification unit 30B, and a third notification unit 30C. In the case that the specification unit 26 is unable to specify the fan configuration pattern, the first notification unit 30A issues a notification that at least one of the number or the type of the fans FN is abnormal. In the case that a rated rotational speed in which the difference thereof from the rotational speed detected by the detection unit 22 lies within an allowable error range cannot be specified, the second notification unit 30B issues a notification that a fan FN other than the prescribed fans FN is connected to the input/output ports 18. In the case that the detection unit 22 is unable to detect the rotational speed, the third notification unit 30C issues a notification that a fan FN is not connected to the input/output ports 18, or alternatively, that the fan FN connected to the input/output ports 18 is defective.

Next, in relation to a setting method for setting a threshold value of a rotational speed when the fans FN are made to rotate, with reference to FIG. 3, a description will be given concerning a procedure of a setting process of the fan control device 10.

In step S1, the fan drive unit 20 outputs a drive current to one of the input/output ports 18 so as to bring about rotation at the rated rotational speed. Upon the fan drive unit 20 outputting the drive current, the setting process transitions to step S2.

In step S2, the detection unit 22 detects the rotational speed on the basis of a signal input from the input/output port 18 to which the drive current was output in step S1. In this instance, in the case that the detection unit 22 was unable to detect the rotational speed, the setting process transitions to step S3. On the other hand, in the case that the detection unit 22 was able to detect the rotational speed, the setting process transitions to step S4.

In step S3, the notification unit 30 (the third notification unit 30C) issues a notification that a fan FN is not connected to the input/output port 18, or alternatively, that the fan FN connected to the input/output port 18 is defective. Upon the notification unit 30 (the third notification unit 30C) issuing such a notification, the setting process transitions to step S7.

In step S4, the acquisition unit 24 increments by one a value indicating the number of detections detected by the detection unit 22 as the number of the fans FN. Upon the acquisition unit 24 carrying out such an increment, the setting process transitions to step S5.

In step S5, using the table, the acquisition unit 24 specifies a rated rotational speed in which the difference from the rotational speed detected in step S2 lies within the allowable error range. In this instance, in the case that the acquisition unit 24 was unable to specify the rated rotational speed, the setting process transitions to step S6. On the other hand, in the case that the acquisition unit 24 was able to specify the rated rotational speed, the acquisition unit 24 acquires the type of the fan FN associated with the specified rated rotational speed as the type of the fan FN connected to the input/output port 18. Upon the acquisition unit 24 acquiring the type of the fan FN, the setting process transitions to step S7.

In step S6, the notification unit 30 (the second notification unit 30B) issues a notification that a fan other than the prescribed fans FN is connected to the input/output ports 18. Upon the notification unit 30 (the second notification unit 30B) issuing such a notification, the setting process transitions to step S7.

In step S7, the fan drive unit 20 determines whether or not the drive current has been output to all of the input/output ports 18. In this instance, in the case that the fan drive unit 20 has not completed outputting of the drive current from all of the input/output ports 18, the setting process returns to step S1. On the other hand, in the case that the fan drive unit 20 has completed outputting of the drive current from all of the input/output ports 18, the setting process transitions to step S8.

In step S8, from among the plurality of the fan configuration patterns stored in the storage unit 14, the specification unit 26 specifies a fan configuration pattern that coincides with the number of the fans FN acquired in step S4 and the type or types of the fans FN acquired in step S5. In this instance, in the case that the specification unit 26 was able to specify the fan configuration pattern, the setting process transitions to step S9. On the other hand, in the case that the specification unit 26 was unable to specify the fan configuration pattern, the setting process transitions to step S10.

In step S9, the setting unit 28 sets, in the fan drive unit 20 connected to the input/output ports 18, threshold values associated with the fan configuration pattern specified in step S8. Upon the setting unit 28 setting such threshold values, the setting process comes to an end.

In step S10, the notification unit 30 (the first notification unit 30A) issues a notification that at least one of the number or the type of the fans FN is abnormal. Upon the notification unit 30 (the first notification unit 30A) issuing such a notification, the setting process comes to an end.

[Exemplary Modification]

The method by which the acquisition unit 24 acquires the number and the type of the fans FN connected to the input/output ports 18 is not necessarily limited to the embodiment described above. For example, the acquisition unit 24 may acquire the number and the type of the fans FN input from the input unit 12 as the number and the type of the fans FN connected to the input/output ports 18. Moreover, in the case that the acquisition unit 24 acquires the number and the type of the fans FN input from the input unit 12 as the number and the type of the fans FN connected to the input/output ports 18, the fan drive unit 20 and the detection unit 22 may be omitted. In this case, the acquisition unit 24 may display on the display unit an input screen in order to input the number and the type of the fans FN connected to the input/output ports 18.

[Inventions]

The first invention and the second invention will be described hereinafter as inventions that are capable of being grasped from the above-described embodiment and the exemplary modification thereof.

(First Invention)

The first invention is characterized by the fan control device (10) having the plurality of input/output ports (18), and which controls one or more fans (FN) that are connected to the plurality of input/output ports (18). The fan control device (10) includes the acquisition unit (24) that acquires the number of the fans and the type of fan of each of the fans (FN) connected to the input/output ports (18), the storage unit (14) in which the plurality of the fan configuration patterns indicating the number of the fans and the type of fan of the fans (FN) are stored, the specification unit (26) which specifies, from among the plurality of the fan configuration patterns stored in the storage unit (14), the fan configuration pattern that coincides with the number of the fans and the type of fan of the fans (FN) acquired by the acquisition unit (24), and the setting unit (28) that sets in the fans (FN) connected to the input/output ports (18) the threshold value of the rotational speed when the fans (FN) are made to rotate, the threshold value being associated with the fan configuration pattern specified by the specification unit (26). In accordance with such features, the fans (FN) can be appropriately controlled even if the fan configuration pattern is changed.

The fan control device (10) may further be equipped with the first notification unit (30A) that issues, in the case that the specification unit (26) is unable to specify the fan configuration pattern, a notification that at least one of the number of the fans (FN) or the type of fan is abnormal. In accordance with this feature, it is possible to issue a notification to the operator that the fan configuration pattern is other than the prescribed fan configuration patterns.

The threshold value associated with the fan configuration pattern may be defined for each type of fan of the fans (FN). In accordance with this feature, the fans (FN) can be appropriately controlled.

The fan control device (10) may further include the fan drive unit (20) which outputs to each of the plurality of input/output ports (18) the drive current that drives each of the fans (FN), and the detection unit (22) that detects the rotational speed based on the signal input from each of the plurality of input/output ports (18), wherein the acquisition unit (24) may acquire the number of detections detected by the detection unit (22), as the number of the fans (FN) connected to the input/output ports (18), and based on the rotational speed detected by the detection unit (22), may acquire the type of fan of the fans (FN) connected to the input/output port (18). In accordance with such features, the number and the type of the fans (FN) can be acquired from a state in which the fans (FN) are actually rotated.

Using the table in which the rated rotational speed of each of the fans (FN) and the type of fan of each of the fans (FN) are associated with each other, the acquisition unit (24) may specify the rated rotational speed in which a difference thereof from the rotational speed detected by the detection unit (22) lies within an allowable error range, and may acquire the type of fan that is associated with the specified rated rotational speed, as the type of fan of the fans (FN) connected to the input/output port (18). In accordance with this feature, the type of the prescribed fan (FN) can be acquired in accordance with the rotational speed.

In the fan control device (10), there may further be provided the second notification unit (30B) that issues a notification that a fan other than the prescribed fans (FN) is connected to the input/output ports (18), in the case that it is impossible to specify the rated rotational speed in which the difference thereof from the rotational speed detected by the detection unit (22) lies within the allowable error range. In accordance with this feature, it is possible to issue a notification to the operator that the fan (FN) is other than the prescribed fans.

(Second Invention)

The second invention is characterized by the setting method of setting the threshold value of the rotational speed when the fan control device (10), having the plurality of input/output ports (18) and that control one or more fans (FN) that are connected to the plurality of input/output ports (18), causes the fans (FN) to rotate. The setting method includes the acquisition step (step S4, step S5) of acquiring the number of the fans (FN) connected to the input/output ports (18) and the type fan of each of the fans (FN) connected to the input/output ports (18), the specification step (step S8) of specifying, from among the plurality of the fan configuration patterns indicating the number of the fans and the type of fan, the fan configuration pattern that coincides with the number of the fans and the type of fan acquired in the acquisition step (step S4, step S5), and the setting step (step S9) of setting in the fans (FN) connected to the input/output ports (18) the threshold value associated with the fan configuration pattern specified in the specification step (step S8). In accordance with such features, the fans (FN) can be appropriately controlled even if the fan configuration pattern is changed.

The setting method may further include the first notification step (step S10) of issuing, in the case that the specification step (step S8) is unable to specify the fan configuration pattern, the notification that at least one of the number of the fans (FN) or the type of fan is abnormal. In accordance with this feature, it is possible to issue a notification to the operator that the fan configuration pattern is other than the prescribed fan configuration patterns.

The threshold value associated with the fan configuration pattern may be defined for each type of fan of the fans (FN). In accordance with this feature, the fans (FN) can be appropriately controlled.

The setting method may further include the output step (step S1) of outputting to each of the input/output ports (18) the drive current that drives each of the fans (FN), and the detection step (step S2) of detecting the rotational speed based on the signal input from each of the plurality of input/output ports (18), wherein, in the acquisition step (step S4, step S5), the number of detections detected in the detection step (step S2) may be acquired as the number of the fans (FN) connected to the input/output ports (18), and based on the rotational speed detected in the detection step (step S2), the type of fan of the fans (FN) connected to the input/output port (18) may be acquired. In accordance with such features, the number and the type of the fans (FN) can be acquired from a state in which the fans (FN) are actually rotated.

In the acquisition step (step S4, step S5), using the table in which the rated rotational speed of each of the fans (FN) and the type of fan of each of the fans (FN) are associated with each other, the rated rotational speed may be specified in which a difference thereof from the rotational speed detected in the detection step (step S2) lies within an allowable error range, and the type of fan that is associated with the specified rated rotational speed may be acquired as the type of fan of the fans (FN) connected to the input/output ports (18). In accordance with this feature, the prescribed type of the fan (FN) can be acquired in accordance with the rotational speed.

In the setting method, there may further be included a second notification step (step S6) of issuing a notification that a fan other than the prescribed fans (FN) is connected to the input/output ports (18), in the case that it is impossible to specify the rated rotational speed in which the difference thereof from the rotational speed detected in the detection step (step S2) lies within the allowable error range. In accordance with this feature, it is possible to issue a notification to the operator that the fan (FN) is other than the prescribed fans.

The invention claimed is:

1. A fan control device including a plurality of input/output ports and configured to control one or more fans that are connected to the plurality of input/output ports, the fan control device comprising:
    an acquisition unit configured to acquire a number of the fans connected to the input/output ports and a type of fan of each of the fans connected to the input/output ports;
    a storage unit in which a plurality of fan configuration patterns indicating the number of the fans and the type of fan are stored;
    a specification unit configured to specify, from among the plurality of the fan configuration patterns stored in the storage unit, a fan configuration pattern that coincides with the number of the fans and the type of fan acquired by the acquisition unit; and
    a setting unit configured to set, in the fans connected to the input/output ports, a threshold value of a rotational speed when the fans are made to rotate, the threshold value being associated with the fan configuration pattern specified by the specification unit.

2. The fan control device according to claim 1, further comprising a first notification unit configured to issue, in a case that the specification unit is unable to specify the fan configuration pattern, a notification that at least one of the number of the fans or the type of fan is abnormal.

3. The fan control device according to claim 1, wherein the threshold value is defined for each type of fan of the fans.

4. The fan control device according to claim 1, further comprising:
    a fan drive unit configured to output to each of the plurality of input/output ports a drive current that drives each of the fans; and
    a detection unit configured to detect the rotational speed based on a signal input from each of the plurality of input/output ports,
    wherein the acquisition unit acquires a number of detections detected by the detection unit, as the number of the fans connected to the input/output ports, and based on the rotational speed detected by the detection unit, acquires the type of fan of the fans connected to the input/output ports.

5. The fan control device according to claim 4, wherein, using a table in which a rated rotational speed of each of the fans and the type of fan of each of the fans are associated with each other, the acquisition unit specifies the rated rotational speed in which a difference thereof from the rotational speed detected by the detection unit lies within an allowable error range, and acquires the type of fan that is associated with the specified rated rotational speed, as the type of fan of the fans connected to the input/output ports.

6. The fan control device according to claim 5, further comprising a second notification unit configured to issue a notification that a fan other than the prescribed fans is connected to the input/output ports, in a case that it is impossible to specify the rated rotational speed in which the difference thereof lies within the allowable error range.

7. A setting method of setting a threshold value of a rotational speed when a fan control device including a plurality of input/output ports and configured to control one or more fans that are connected to the plurality of input/output ports, causes the fans to rotate, the setting method comprising:
    an acquisition step of acquiring a number of the fans connected to the input/output ports and a type of fan of each of the fans connected to the input/output ports;
    a specification step of specifying, from among a plurality of fan configuration patterns indicating the number of the fans and the type of fan, a fan configuration pattern that coincides with the number of the fans and the type of fan acquired in the acquisition step; and
    a setting step of setting, in the fans connected to the input/output ports, the threshold value associated with the fan configuration pattern specified in the specification step.

8. The setting method according to claim 7, further comprising a first notification step of issuing, in a case that the specification step is unable to specify the fan configuration pattern, a notification that at least one of the number of the fans or the type of fan is abnormal.

9. The setting method according to claim 7, wherein the threshold value is defined for each type of fan of the fans.

10. The setting method according to claim 7, further comprising:
    an output step of outputting to each of the input/output ports a drive current that drives each of the fans; and
    a detection step of detecting the rotational speed based on a signal input from each of the plurality of input/output ports,
    wherein, in the acquisition step, a number of detections detected in the detection step is acquired as the number of the fans connected to the input/output ports, and based on the rotational speed detected in the detection step, the type of fan of the fans connected to the input/output port is acquired.

11. The setting method according to claim 10, wherein, in the acquisition step, using a table in which a rated rotational speed of each of the fans and the type of fan of each of the fans are associated with each other, the rated rotational speed is specified in which a difference thereof from the rotational speed detected in the detection step lies within an allowable error range, and the type of fan that is associated with the specified rated rotational speed is acquired as the type of fan of the fans connected to the input/output ports.

12. The setting method according to claim 11, further comprising a second notification step of issuing a notification that a fan other than the prescribed fans is connected to the input/output ports, in a case that it is impossible to specify the rated rotational speed in which the difference thereof lies within the allowable error range.

* * * * *